US006575258B1

United States Patent
Clemmer

(10) Patent No.: US 6,575,258 B1
(45) Date of Patent: Jun. 10, 2003

(54) ELECTRIC CURRENT AND CONTROLLED HEAT CO-GENERATION SYSTEM FOR A HYBRID ELECTRIC VEHICLE

(76) Inventor: Steven Lynn Clemmer, Baton Rouge, LA (US)

( * ) Notice: Subject to any disclaimer, the term of this patent is extended or adjusted under 35 U.S.C. 154(b) by 0 days.

(21) Appl. No.: 09/577,670

(22) Filed: May 25, 2000

Related U.S. Application Data

(60) Provisional application No. 60/171,403, filed on Dec. 21, 1999.

(51) Int. Cl.[7] .............................................. B60K 11/02
(52) U.S. Cl. ........................................ 180/68.5; 165/41
(58) Field of Search ............................... 180/65.2, 65.3, 180/65.4, 68.2, 68.4, 68.5, 68.6, 69.2; 318/139; 296/208; 165/41.51

(56) References Cited

U.S. PATENT DOCUMENTS

| | | | | |
|---|---|---|---|---|
| 3,970,164 A | * | 7/1976 | Suzuki ...................... | 180/68.4 |
| 4,021,677 A | * | 5/1977 | Rosen et al. ................ | 180/65.2 |
| 4,313,080 A | | 1/1982 | Park | |
| 4,660,624 A | * | 4/1987 | Yamaguchi ................ | 180/68.4 |
| 5,031,712 A | | 7/1991 | Karolek et al. | |
| 5,291,960 A | | 3/1994 | Brandenburg et al. | |
| 5,443,926 A | * | 8/1995 | Holland et al. ............ | 180/68.5 |
| 5,490,572 A | | 2/1996 | Tajiri et al. | |
| 5,549,153 A | * | 8/1996 | Baruschke et al. ........ | 180/68.5 |
| 5,620,057 A | | 4/1997 | Klemen et al. | |
| 5,624,003 A | | 4/1997 | Matsuki et al. | |
| 5,678,760 A | | 10/1997 | Muso et al. | |
| 5,730,237 A | | 3/1998 | Matsuki et al. | |
| 5,731,568 A | * | 3/1998 | Malecek ..................... | 180/68.5 |
| 5,821,706 A | | 10/1998 | Koga | |
| 6,029,762 A | * | 2/2000 | Kepner ....................... | 180/68.5 |
| 6,213,133 B1 | * | 4/2000 | Sonntag et al. ............. | 180/65.2 |
| 6,056,075 A | * | 5/2000 | Kargilis ..................... | 180/69.2 |
| 6,124,644 A | * | 9/2000 | Olson et al. ................ | 180/65.2 |
| 6,223,844 B1 | * | 5/2001 | Greenhill et al. ........... | 180/65.3 |
| 6,266,956 B1 | * | 7/2001 | Suzuki et al. .............. | 180/65.2 |

FOREIGN PATENT DOCUMENTS

| | | | | |
|---|---|---|---|---|
| AT | 169874 | * | 12/1951 | ................. 180/68.2 |
| DE | 941892 | * | 4/1956 | ................. 180/68.4 |
| FR | 651868 | * | 2/1929 | ................. 180/68.4 |
| GB | 738985 | * | 10/1955 | ................. 180/68.5 |
| JP | 3-167033 | * | 7/1991 | ................. 180/68.5 |

* cited by examiner

*Primary Examiner*—Frank Vanaman
(74) *Attorney, Agent, or Firm*—Patton Boggs LLP

(57) ABSTRACT

An internal combustion engine in a hybrid electric vehicle powers an alternator or generator, providing current while the engine's cooling system supplies heat to warm or cool the batteries in a thermostatically controlled manner. Further embodiments utilize heat from the exhaust and catalytic converter to maintain the engine's temperature at an efficient level, and increase the amount of usable heat energy within the system. Organized compartmentalization and insulation of system components controls storage, distribution and release of heat energy during operation and shut-down for increased efficiency and reduced pollutant emissions.

8 Claims, 6 Drawing Sheets

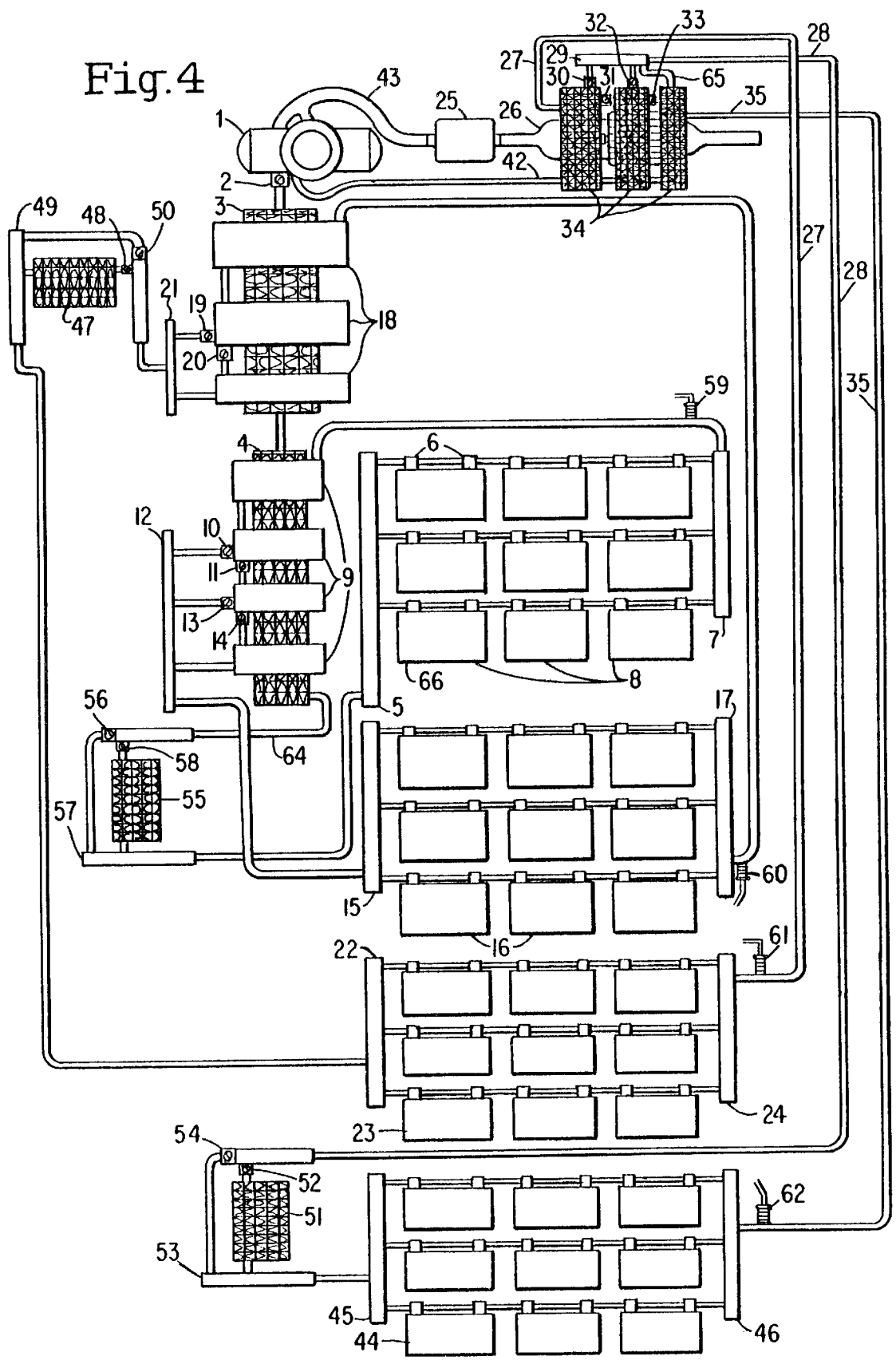

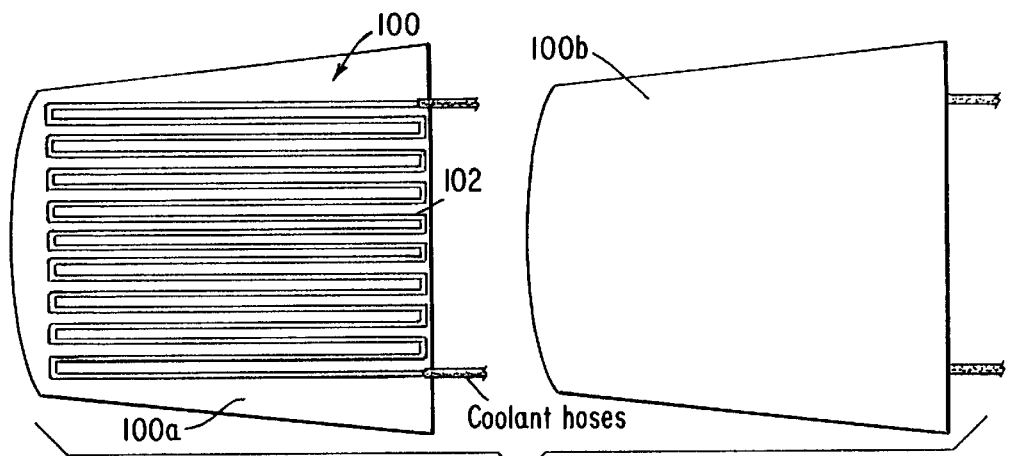
Fig.5
Fig.6
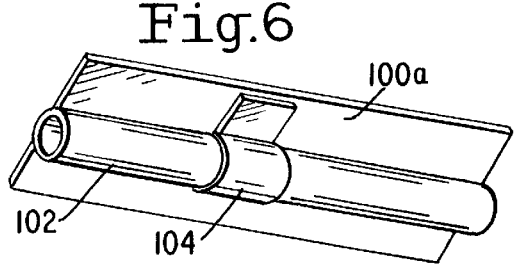
Fig.7
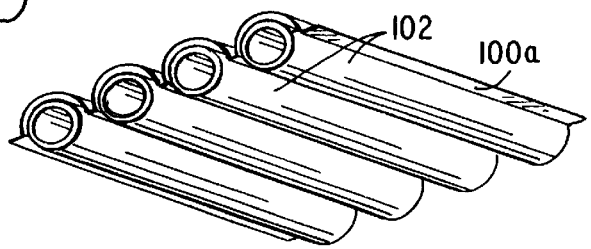
Fig.9
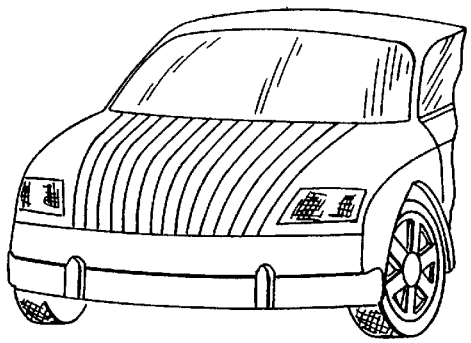
Fig.8
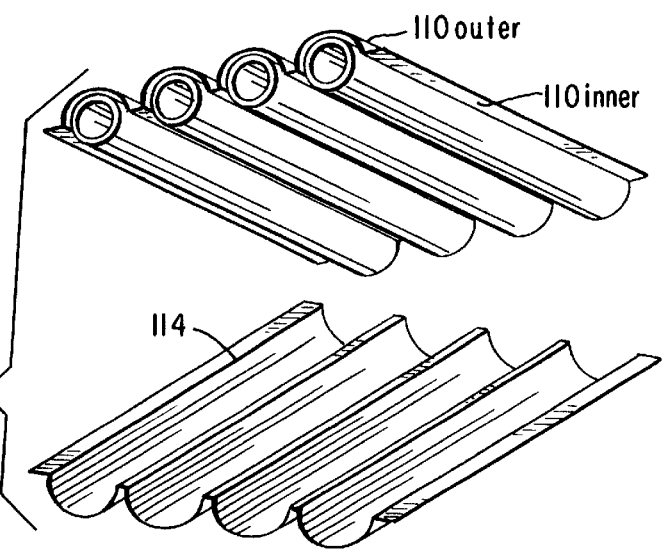

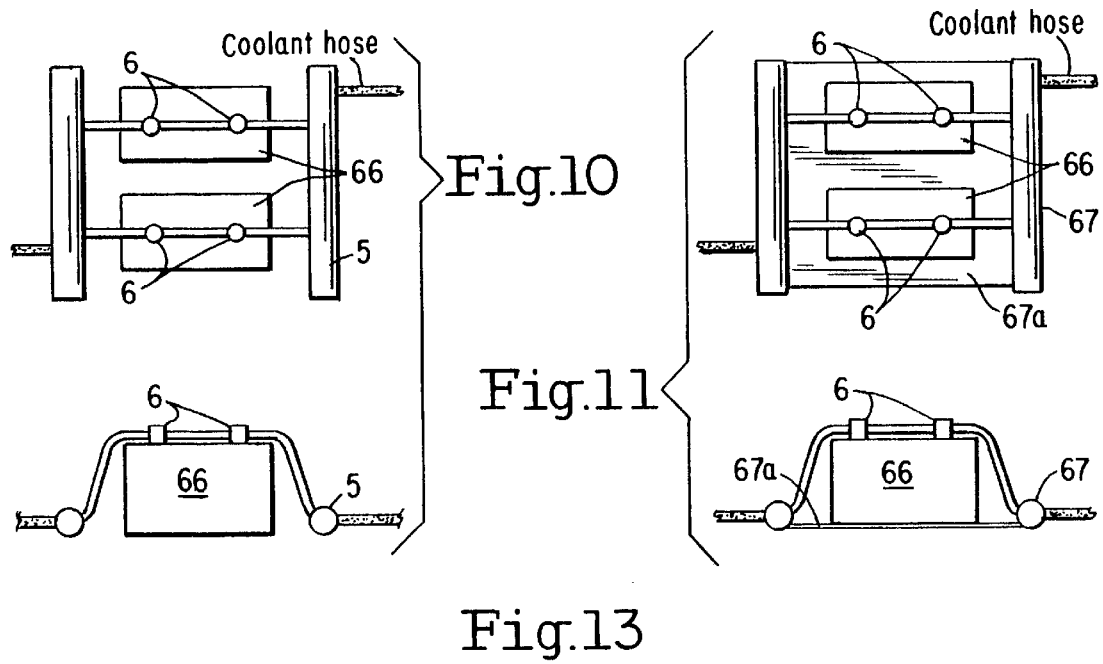
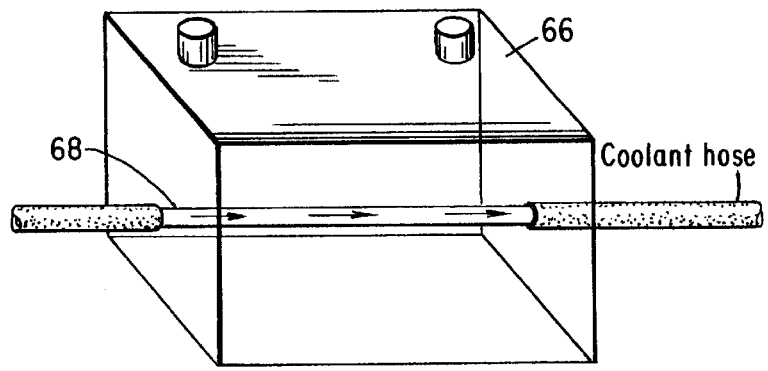
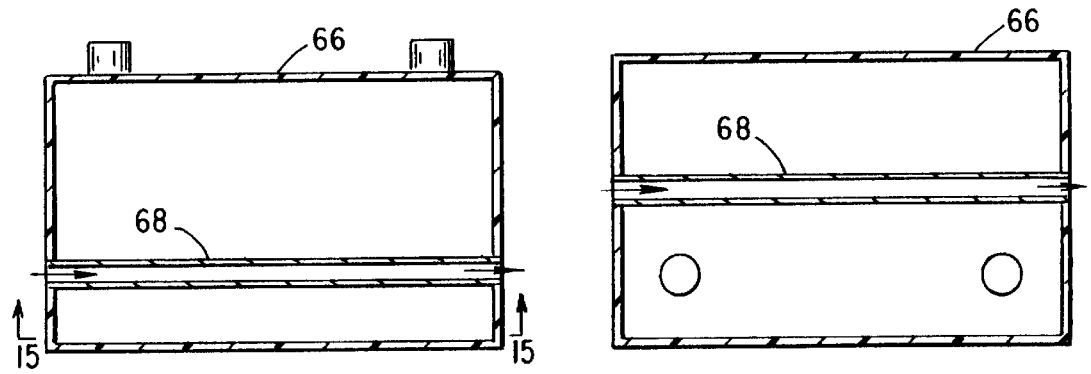

ELECTRIC CURRENT AND CONTROLLED HEAT CO-GENERATION SYSTEM FOR A HYBRID ELECTRIC VEHICLE

This application claims the benefit to Provisional Application Ser. No. 60/171,403 filed Dec. 21, 1999.

BACKGROUND OF THE INVENTION

1. Field of the Invention

This invention relates to a hybrid electric vehicle comprising an internal combustion engine, charging system, batteries and electric motor and, more particularly, to a hybrid vehicle temperature control system utilizing heat from the internal combustion engine to maintain the batteries within a predetermined temperature range for enhanced storage capacity and extended battery life, within a variety of climatic and operating conditions.

2. Description of the Related Art

Pure electric vehicles use batteries as the sole energy supply for all of the vehicle's functions, at all times. This includes supplying heat for passengers in cold weather. Although batteries supply clean energy, their storage capacity is limited. The additional drain of providing heat to the passenger compartment further reduces range and performance. This problem is exacerbated by the effect of cold on batteries—low temperatures diminish their available energy. If low enough, cold will deaden and damage the batteries.

Internal combustion engines, unlike electric motors, easily produce large amounts of power without requiring massive energy storage devices such as batteries. This is well-known, as evidenced by the large number of internal combustion vehicles on the road today. An equally well known fact is that internal combustion engines are polluting, as anyone can witness the smog problem continuing to plague cities and their suburbs. Further, the news reports of pollution from developing countries, with large numbers of people turning to automobiles for conveyance, are increasing. Linked to their pollution problem is that internal combustion engines are inefficient, as they waste most of the fuel energy as heat. More than half of the available energy in gasoline is lost as heat from the exhaust pipe and radiator. Adding to the inefficiency is that internal combustion engines, due to their power versus engine speed characteristics require speed reduction units. e.g., transmissions, to utilize their output. The typical transmission in the average car on the road today weight several hundred pounds. Still another shortcoming with internal combustion engines is that they are not efficient before reaching their optimum operating temperature. Therefore, the typical driver has two choices; one is to warm the engine up until it reaches that temperature, which wastes fuel, and the other is to drive off immediately, which wastes fuel as well, in addition to hastening engine wear.

Electric vehicles have been considered as a solution to the environmental problems of internal combustion engines. However, there are multiple problems, some of which have been identified above, which combine to make electric vehicles impractical for most applications today. Vehicle range is a major problem. Batteries do not have enough storage capacity in terms of amp-hours per pound or per cubic foot. Batteries are expensive. Therefore, if a vehicle is designed to have a load capacity comparable to one having an internal combustion engine, and have acceptable speed and acceleration, and yet be affordable, the range is limited to about a hundred miles. Increasing the range, for example, to two hundred miles would require approximately twice the battery capacity. It is well known in the art that, in view of the large amount of vehicle volume already filled with batteries, together with their weight and cost, that such an increase might render the vehicle impractical.

The problems of high battery cost, in terms of purchase price and vehicle weight, and limited range imposed by that cost is severely exacerbated by cold climate. A major cause of this climate-induced problem is that the capacity of lead-acid batteries diminishes as the temperature goes down. For example, a conventional lead-acid battery in a standard automobile which is typically rated at 200 ampere hours when new, will test at approximately one half that value when the battery is chilled down to 20 degrees Fahrenheit. This problem is generally tolerable for internal combustion cars, because the battery has enough excess capacity, until it ages approximately three years, to operate the starter motor, even when half of its reserve is gone due to the cold weather. However, the present inventor has recognized that the deleterious effects of cold weather on the batteries of electric vehicles require a new method and apparatus.

Yet another problem is that batteries generate heat when subjected to the drain and recharge rates required for electric vehicles. This problem is of particular concern if the vehicle will be subjected to high-demand driving, such as hard acceleration, sustained high speeds, and climbing grades. The heat build-up can significantly reduce the life of the battery. Because these driving conditions are unavoidable, compensation must be made, including reducing the vehicle's design speed and reducing its acceleration, which in turn reduces the maximum rate of discharge. These solutions however, decrease the practicality, safety, and appeal of an electric vehicle.

There are other issues pertaining to battery temperature that affect its peak current discharge, storage capacity and life. More particularly, several battery types deliver maximum output at higher temperatures, because their energy is stored in a chemical reaction which is temperature dependent. Lowering the temperature suppresses the activity of the reaction, and raising the temperature (within the limitation of the batteries' tolerance) increases the available output.

For example, the practical output of power for lead-acid batteries is highest at about 43 degrees C. (110 degrees F.)—roughly double the output of the same battery below 0 degrees C. Similarly, optimal temperatures for nickel-cadmium and metal hydride batteries are approximately 30 degrees C. (86 degrees F.) and 45 degrees C. (113 degrees F.), respectively. Sodium-nickel batteries will not function at all below 200 degrees C.

The result is that even on a hot summer day, the full output of many battery types is not available. In cold months, it becomes fractional.

Hybrid vehicles have been identified as a partial solution to the above-identified problems. A hybrid vehicle is obtained by installing a small internal combustion engine and alternator or generator into an electric vehicle. The immediate improvement over a pure electric vehicle is that the batteries can be charged while the vehicle is moving, and thus the range can be increased over what is possible with stationary charging. In addition, the internal combustion engine and generator can provide added current to the electric motor during heavy load or high-demand acceleration conditions. However, the internal combustion engine reintroduces the pollution and fuel consumption problems which the electric vehicle was directed to solving. In addition, the inefficiencies of the internal combustion engine, in terms of the percentage of available energy of the fuel that is converted into motion of the vehicle, is exacerbated when used in a hybrid vehicle. The reason is that generators are, at best, about 75% efficient, meaning that 25% of the power driving the generator is converted into heat, instead of into electric current.

Therefore, a need exists for improving the battery storage capacity of a hybrid vehicle such that its internal combustion engine can be substantially smaller than that required by prior art hybrid vehicles, without any sacrifice in performance or increased cost.

SUMMARY OF THE INVENTION

These and other objectives are achieved by the present invention's novel feature of transferring heat from the internal combustion engine of a hybrid vehicle to the vehicle's batteries, in a controlled manner, to quickly bring the batteries up to their optimal operating temperature, and maintain them at that temperature, regardless of variations in operating conditions and environment.

A first embodiment comprises a small internal combustion engine, large enough to produce adequate heat for warming the passenger compartment, drives an alternator or generator. Hot coolant from the engine passes through a radiator which also serves as the passenger heater. Coolant from the radiator/heater then circulates through a regulated flow heat exchanger system, having structure thermally conductive with the batteries, for regulating battery temperature. The coolant, after being heat-depleted by circulation through the battery exchanger system, flows to a second exchanger in contact with heat recovered from the engine exhaust and catalytic converter gases. Heat energy absorbed from the exhaust exchanger reheats the coolant to a temperature, set by thermostatically regulated flow through the exhaust exchanger, which is for optimal operating efficiency of the engine, and then returns to the engine block.

Once the batteries have reached their pre-determined operating temperature, the internal combustion engine of the hybrid system may be shut off. The vehicle can then operate as a pure electric vehicle. The internal combustion engine is restarted if passenger heat is needed or if the battery temperature becomes too low.

An alternator driven by the internal combustion engine supplies electrical current for auxiliary power and recharging the batteries. When the vehicle is stationary, as at a stop-light or traffic jam, the system can continue charging the batteries. In urban driving conditions, this self-generated power can extend the range of the vehicle, and provide current to compensate for the drain of night-time lighting.

During warm weather, passenger heat is not needed, and the internal combustion engine of the hybrid system can be shut off once the batteries are at optimal temperature. Operation of the system can be resumed to meet high-demand driving situations, or when driving the vehicle near the limit of its charge range, or in a low state of charge. When the hybrid system is in operation, and the vehicle driven in rapid discharge situations, the system allows some of the resulting excess heat to be removed through the regulatory components using an external exchanger. This function protects the batteries from damage and increases their life. When the vehicle is not in use, it can be charged from an electrical outlet, just as a pure electric vehicle would.

A further embodiment of the invention comprises, in combination with the first embodiment, a plurality of flow tubes disposed with one or more of the batteries, to provide a flow path for the heat exchanger fluid through said one or more batteries.

A still further embodiment comprises, in combination with either of the above-summarized embodiments, a radiator formed integral with one or more of the external body panels of the automobile.

BRIEF DESCRIPTION OF THE DRAWINGS

FIG. 4 is a schematic of a system according to that of FIG. 1, further comprising the external exchanger assembly of FIG. 3 and battery array temperature sensors;

FIG. 5 is an underside and overhead view of the components of an embodiment of the integrated external exchanger (top sheet only);

FIG. 6 is a detail view of an arrangement of coolant tubing and a flat outer hood sheet, for the integrated external exchanger of FIG. 5;

FIG. 7 depicts an example arrangement between coolant tubing and a conforming, corrugated outer hood sheet for the integrated external exchanger of FIG. 5;

FIG. 8 depicts the arrangement of FIG. 7 further including a mating inner hood sheet, for the integrated external exchanger of FIG. 5;

FIG. 9 is a perspective view of one of example many possible appearances of the integrated external exchanger according to FIG. 5, embodied as a front hood of an automobile;

FIG. 10 is an overhead and side view of two line ducts connected to batteries equipped with battery thermal exchangers;

FIG. 11 is an overhead and side view of integrated line ducts—line ducts modified by the addition of a connecting, conductive plate between them, in contact with battery faces;

FIG. 13 is a perspective view of an example battery exchange channel, passing through the interior of the battery; and FIG. 14 is a side cross-sectional view of the example battery heat exchange channel of FIG. 13; and FIG. 15 is a bottom cross-sectional view of the example battery heat exchange channel of FIG. 13.

Engine access panel depicted as removed, open section. Fan and air duct from passenger heater and exchanger compartment shown on left side—intake duct for same compartment shown extending from right side.

DESCRIPTION OF THE PREFERRED EMBODIMENTS

Figure 1:
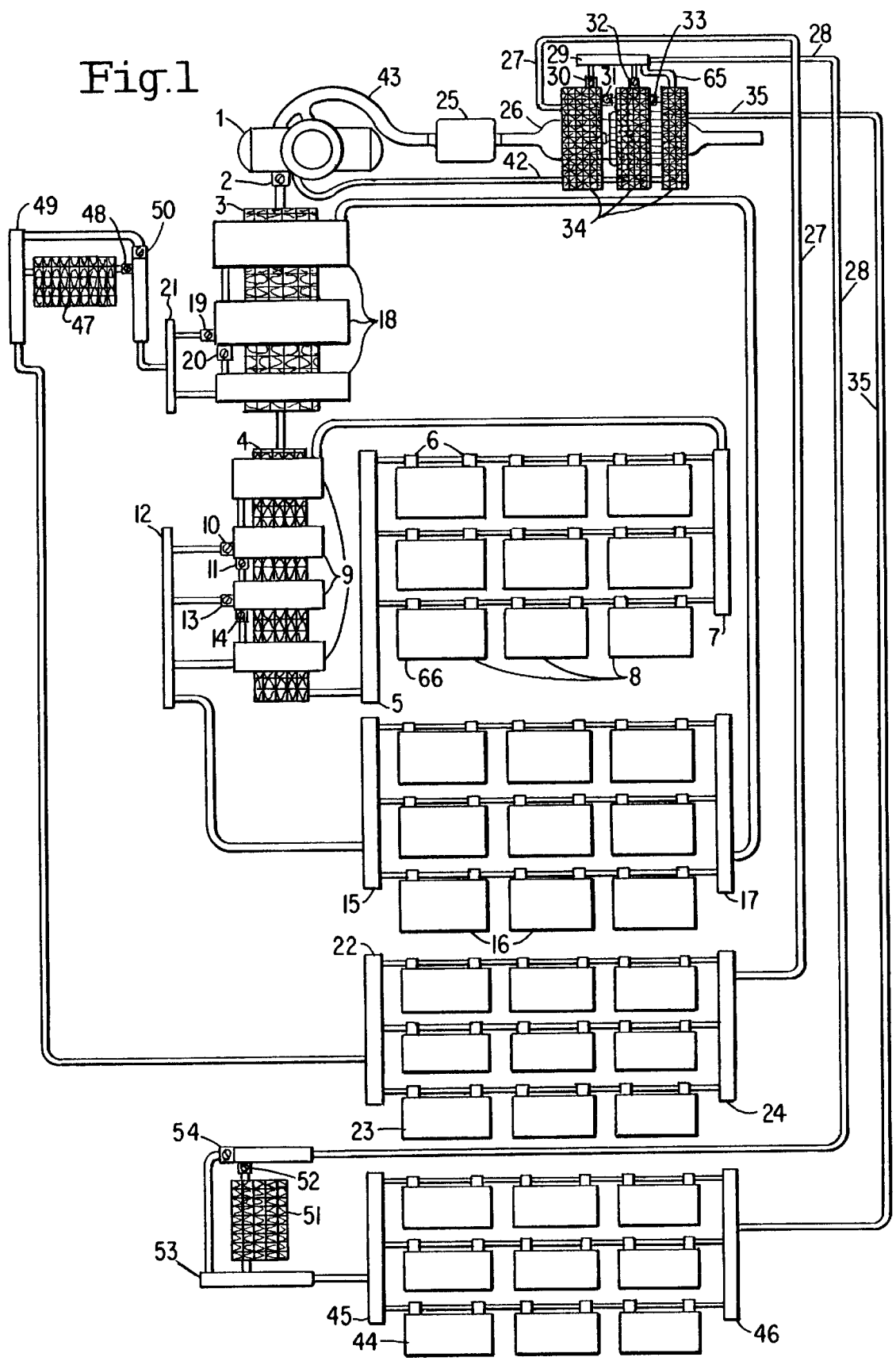
FIG. 1 is a schematic view of the hybrid electric energy system exchangers, batteries, engine-alternator, and other system components.

FIG. 1 represents a high-level system diagram of the hybrid vehicle charging and battery temperature control system of the present invention. Referring to FIG. 1, and all other figures of this description, it will be understood that the depicted placement of the components is only for purposes of example and ease of description. Many variations are within the contemplated scope of this invention and, unless stated or otherwise made clear, the placement and arrangement of the described components is a design choice.

Referring to FIG. 1, engine 1 charges the vehicle's batteries 2 through a conventional alternator (not shown). Engine 1 is a small internal combustion engine, such as a two stroke Otto cycle engine, a four stroke Otto cycle engine, a diesel engine, a Wankel, or a gas turbine. The specific type of the internal combustion engine 1 is not material to the invention. Moreover, the criteria for selecting the type of engine, as well as its size and power are clearly within the skill of one of ordinary skill in the art. For purposes of example, factors known to one of skill in the art on which the horsepower and size are selected include the vehicle load capacity, desired performance, vehicle range, fuel economy, type and grade of fuel, and target purchase price. However, for purposes of example, it is contemplated by this invention that the typical engine 1 for a four passenger vehicle, having a range in excess of two hundred miles, would have between five and ten DIN horsepower, and a displacement similar to or less than that of a small motorcycle. As far as fuel capacity and mileage, the engine 1 can operate at a substantially constant load and rpm because it is driving the alternator, not the vehicle. Therefore fuel consumption for typical commuting distances and conditions would be on the order of a liter of fuel.

Co-generated current from the alternator can be appreciable. An Otto cycle engine with an output as small as 6-hp can deliver in excess of 3,000 watts. It is understood that "engine 1" includes all peripheral engine components such as the fuel system, ignition system, starter motor, coolant pump and alternator which are well known in the art and readily identified by one of ordinary skill in the automobile arts.

The low fuel requirement allows economical use of more expensive alternative and renewable fuels (methanol, ethanol, hydrogen, plant-derived diesel, etc.). The bulk of hydrogen tanks would not be an obstacle, due to the small volume of fuel needed. This variant would be a zero-emissions hybrid. Even using common fuels—gasoline and diesel—the small engine displacement would result in very low-emissions vehicles.

The engine 1 shown in FIG. 1 is started by a small conventional-type electric starter or a combined alternator-starter device (not shown). The engine 1 powers the battery-charging alternator (not shown) which produces electric current for charging the batteries. When the engine block has warmed, the block thermostat 2 opens. Hot coolant from the engine 1 flows into the radiator/heater 3, and from there to a primary exchanger 4. The coolant from the primary exchanger 4 is distributed through multiple hoses on the line duct 5 to battery thermal exchangers 6 on each of the batteries.

Figure 2:
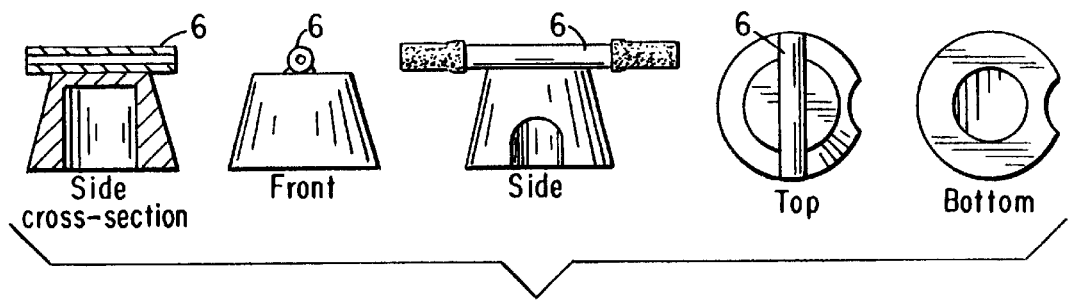
FIG. 2 represents multiple outer and sectional views of a battery thermal exchanger device for controlling battery heat energy.

The battery thermal exchanger 6, shown in FIG. 2, admits coolant through a channel within the exchanger. The flowing coolant warms or cools the exchanger, depending on their relative temperature. The thermal exchanger 6 is composed of a thermally conductive, electrically insulative material (vitreous, ceramic, etc.). The battery thermal exchanger 6 preferably has a layer of heat-insulating material (not shown) covering its external surface to improve heat transfer efficiency.

Heat is transferred by direct contact of the battery thermal exchanger 6 with the battery post (or comparable terminal). Since the batteries can serve as a large heat sink for the engine, the remaining heat exchange components can be minimally small and light.

Referring again to the depicted operation at FIG. 1, after the coolant passes through the battery thermal exchangers 6 on the first battery array 8 (thereby warming or cooling the batteries' interiors), the coolant then collects in the next line duct 7 and is carried to the outer primary array exchanger 9.

The exchanger 9 is shown enclosing the primary array exchanger 4 in four segments, labeled 9a–9d, respectively. The exchanger segments 9 are connected to each other through a pair of thermostats 11 and 14. The two middle segments, 9b and 9c, are connected to an exit line duct 12 by another pair of thermostats 10 and 13.

The thermostats 11 and 14 connecting the exchanger segments 9 are open below the optimal operating temperature of the batteries in the first array 8, and are closed above the batteries' optimal temperature. The other thermostats 10 and 13 on the middle exchanger segments 9b and 9c respond oppositely to the coolant temperature—they are closed below the batteries' optimal temperature and are open above the batteries' optimal temperature. As a result, when the coolant from the first battery array 8 enters the first exchanger segment 9a and passes to the second exchanger segment 9b, its subsequent path will be determined by its temperature.

When the coolant is cold, the thermostat 10 on the second segment 9b leading to the exit duct 12 will be closed. The other thermostat 11 on the second segment 9b will be open, and the coolant will flow into the third segment 9c. Similarly, when the coolant is cold, it will flow through the third segment 9c and out of thermostat 14 into the fourth segment 9d. From the fourth segment 9d the coolant goes directly to the line duct 12.

The outer primary array exchanger segments 9a–9d enclose the primary array exchanger 4, and absorb heat directly from it. As a result, as the coolant passes through each exchanger segment 9a–9d, it has more time to absorb heat from the primary array exchanger 4 inside. When the system is cold, the coolant will pass through all four segments of the exchanger 9a–9d, and into the line duct 12 to the second battery array 16.

Under control of the above-described arrangement of thermostats, as the system begins to warm from continued operation the flow through the exchanger segments 9a–9d changes. Once the system temperature has risen sufficiently, the coolant flowing through the exchanger segments 9a and 9b will absorb enough heat to reach the optimal battery temperature as it enters the third exchanger segment 9c. This increase in temperature causes the thermostat 14 to close, blocking the flow of coolant to the fourth segment 9d. The other thermostat 13 on the third segment 9c opens, bypassing the coolant at the optimal temperature into the line duct 12, and from there to the second battery array 16.

As the temperature of the system continues to increase, the coolant circulating through the outer primary array exchanger 9 reaches optimal battery temperature by the second segment 9b. The second segment thermostat 11 closes and the other thermostat 10 opens, again bypassing the coolant at the desired temperature to the line duct 12, and from there to the second battery array 16.

The warmed coolant is fed to the second battery array 16 through a line duct 15. As in the previous array coolant flowing through the battery thermal exchangers 6 moderates the batteries' temperature. If the batteries are cold, heat is absorbed from the coolant and the coolant exits the array 16 through a line duct 17 at a temperature below the optimal battery temperature. If the second array batteries 16 are at the optimal temperature, the coolant exits them with no net change in temperature. If the batteries in the second array 16 are above the optimal temperature (as may result from rapid discharge and high demand) the coolant absorbs some of the excess heat and exits the array at a temperature above the optimal battery temperature.

Coolant from the second battery array next circulates to the outer radiator exchanger 18. The outer radiator exchanger functions to control the coolant temperature in a manner similar to the outer primary exchanger 9 described before. It consists of three segments, labeled 18a, 18b, and 18c, enclosing the radiator/passenger heater 3. Coolant from the first segment 18a flows directly into the second segment 18b. Each segment absorbs heat from the radiator/passenger heater 3. If the coolant flowing into the second segment 18b is below the optimal operating temperature of the batteries, the thermostat 20 to the third segment 18c remains open. The coolant absorbs additional heat there, and passes to the line duct 12.

If the coolant in the second segment 18b of the exchanger 18 is at or above the optimal battery temperature, the other second segment thermostat 19 opens, while the thermostat 20 to the third segment 18c closes, bypassing the coolant to the line duct 21. The coolant moves next to the auxiliary heat duct 49. If the coolant is at or below the optimal battery temperature the coolant flows through the open thermostat 50, and from there to the third battery array 23. If, instead, the coolant in the auxiliary heat duct 49 is above the optimal temperature, the thermostat 50 closes and the adjacent thermostat 48 opens, circulating the coolant through the auxiliary heat exchanger 47. The result is that air drawn into the vehicle's passenger compartment by a duct fan (not shown) passes over the surface of the auxiliary heat exchanger 47, reducing the temperature of the coolant and warming the air for the passenger compartment. Air is similarly drawn over the surfaces of the radiator/heater 3 and the outer primary array exchanger 18 enclosing them, supplying passenger heat. The movement of air over the exchange surfaces allows the thermostatic system to stabilize the coolant temperature at the predetermined optimal battery temperature. Any heat not removed from the exchangers for passenger heating is available for battery temperature control. The time required to bring all of the batteries to full operating temperature will be directly affected by the rate of airflow.

Referring again to FIG. 1, once the coolant temperature has been modified by the auxiliary heat exchanger, the coolant is directed to the third battery array 23. If the batteries have reached operating temperature, the coolant exits the array 23 at the same temperature. If the array is above temperature, some of the heat is carried away by the coolant. If the temperature of the batteries is below optimum, the coolant increases their temperature and leaves the array below the optimum temperature.

Coolant from the third battery array next enters the outer exhaust heat recovery exchanger 34 through the return hose 27. The outer exhaust heat recovery exchanger 34 is part of an exchange system for recovering heat from the exhaust gases and catalytic converter 25. The details of this system are shown in FIG. 3.

Figure 3A:
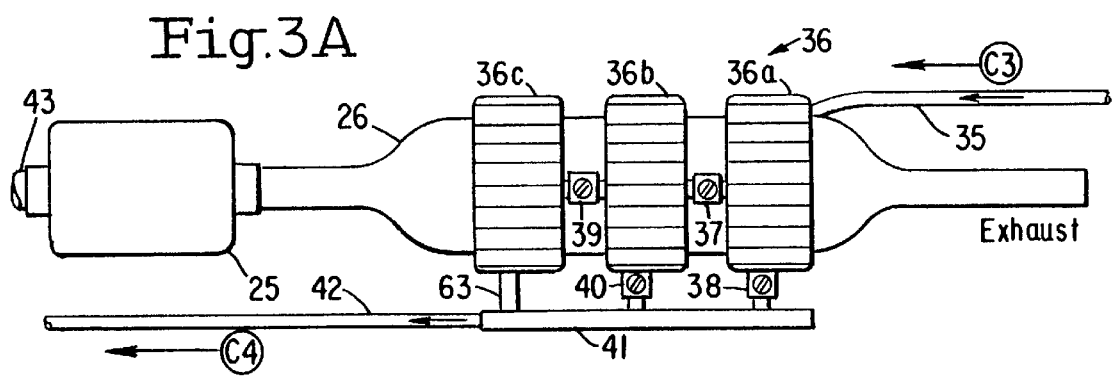
FIG. 3 is an inner and outer view of the components comprising the exhaust heat recovery exchanger assembly.
Figure 3B:
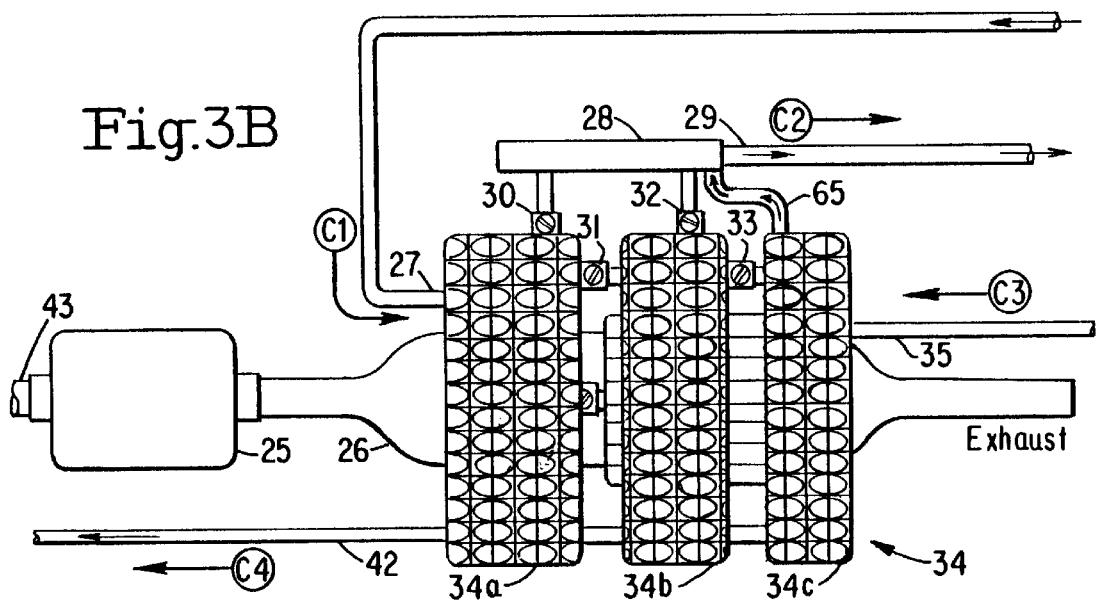

As shown at FIG. 3, the coolant C1 from the third battery array enters the outer exhaust heat recovery exchanger 34 through a return hose 27. The outer exhaust heat recovery exchanger 34 consists of three segments, labeled 34a, 34b, and 34c, respectively, which are interconnected by two thermostats (thermostats 31 and 33). Thermostats 31 and 33 are open below the optimal battery temperature, and close above that temperature. Thermostats 30 and 32 connect the first and second exchanger segment, 34a and 34b, to the line duct 29 as follows: each is closed when the batteries are below their predetermined optimal operating temperature and are open when the batteries are above that optimal operating temperature. The third exchanger segment 34c is connected to the line duct 29 by a hose 65.

Referring to FIG. 3, the outer exhaust heat recovery exchanger segments 34a–c are heated by the inner exchanger segments 36 that they enclose. When the system is cold at start-up and the coolant C1 entering the first outer exchanger segment 34a is below the optimal battery temperature, thermostat 30 is closed and thermostat 31 is open—coolant moves into the second outer exchanger segment 34b. The coolant absorbs additional heat in the second segment 34b—if the temperature in the second segment is still below the optimal temperature, thermostat 32 remains closed and the coolant flows through the open thermostat 33 into the last outer exchanger segment 34c.

The coolant absorbs additional heat from the last exchanger segment 34c and goes directly into the line duct 29. From the line duct 29, the coolant C2 moves next to the fourth battery array 44. Referring to FIG. 3, if the coolant entering the outer exchanger 34 reaches the optimal temperature in the second exchanger segment 34b, thermostat 33 will close, blocking the flow to the third exchanger segment 34c. At the same time, thermostat 32 opens, diverting the coolant C2 to the line 29 and from there to the fourth battery array 44. Similarly, if the coolant C1 entering the first outer exchanger segment 34a is at optimal temperature, or above, thermostat 31 closes and thermostat 30 opens, again diverting the flow of coolant C2 to the line duct 29 and from there to the fourth battery array 44.

Referring to FIG. 1, before entering the fourth battery array 44, the coolant passes through another heat exchanger system 51, comprising an auxiliary heat duct 52, heat exchanger 53, and thermostat device 54 identical in structure and function to the heat exchanger described earlier. Coolant entering the device at above the optimal temperature of the batteries is diverted to the auxiliary heat exchanger 51, its excess heat used for passenger heating.

The temperature-controlled coolant now enters the line duct 45 and is distributed to the fourth battery array 44. If the entire co-generation system is at a cold start-up and both the batteries and coolant are initially cold, the coolant will begin to rise in temperature first. The colder batteries will absorb from the coolant any heat in excess of their own. Once the system has warmed and the coolant has stabilized at the optimal battery temperature, and the batteries have also fully absorbed enough heat to reach the same temperature, the coolant will enter and exit the battery array 44 at the same temperature. The coolant from the fourth battery array 44 returns to the exhaust heat recovery system through the return hose 35.

Referring to FIG. 3, the coolant C3 first enters the first segment 36a of the inner exchanger 36. The first inner exchanger 36a absorbs heat directly from the expansion chamber 26. The expansion chamber 26 is internally heated by the passage of hot gases from the exhaust manifold 43 and the catalytic converter 25. These gases originate as the waste product of the engine 1 as it supplies electric current and temperature equilibrated coolant.

Referring to FIG. 3, the coolant C3 returning from the last battery array 44 and entering the inner exchanger 36 will be near the optimal battery temperature, once the entire system has begun to warm. For most types of batteries commonly used for, and contemplated for, powering electric vehicles, this temperature would be well below the operating temperature of internal combustion engines. The introduction of low-temperature coolant into the engine block would overcool the engine. As is well known in the art of internal combustion engines, excessive cooling lowers the engine's efficiency. To avoid this problem, the present invention's exhaust heat recovery exchangers 36 allow the returning coolant C3 to recover heat energy from the exhaust gases, raising the temperature of the coolant closer to the ideal engine operating temperature. This function begins with the entry of the coolant C3 from the return hose 35 into the inner exchanger 36, shown in FIG. 3.

The example inner exhaust heat recovery exchanger 36 shown at FIG. 3 consists of three segments, labeled 36a, 36b, and 36c. The direction of coolant flow depicted begins with the rightmost of the segments, which is 36a. The first inner exhaust exchanger 36 is heated by the expansion chamber 26. Exhaust gases passing into the expansion chamber 26 from the exhaust manifold 43 and the catalytic converter 25 are at scorching temperatures (over 400 C.). The expansion chamber 26 allows this hot exhaust to expand, however, which reduces its temperature to prevent overheating the coolant in the exchangers above the boiling point. The expansion chamber 26 also provides an increased area of surface contact between the exchangers and the hot gases, improving the transfer and absorption of heat energy into the coolant. The expansion chamber 26 can also aid in controlling engine exhaust noise.

Because extremely small engines can be used in the hybrid system, engine noise is minimized—but the sound can be further moderated by varying the shape, size and composition of the expansion chamber 26, using techniques that are well known in the art of internal combustion engines. This permits a smaller muffler (not shown), or allows the elimination altogether of a muffler and its unnecessary weight.

The specific internal design of the expansion chamber 26 may be a simple, cheap, hollow chamber, or alternatively, internal baffles may be included. The contact of the baffles with the outer shell of the expansion chamber 26 can improve the efficiency of heat transfer, and at the same time function as an effective muffler. Forming the skin of the expansion chamber 26 in convoluted shapes will allow further means of increasing surface area and simultaneously modifying the exhaust note and level.

Referring again to FIG. 3 and continuing the description of the exhaust heat recovery exchangers; it is seen that the first inner exhaust exchanger 36a has two thermostats, labeled as 37 and 38. Thermostat 37 is connected to the middle inner exchanger segment 36b. This thermostat 37 is open at temperatures below the ideal coolant return temperature for the engine. The thermostat is closed at temperatures above the ideal return coolant temperature.

The other thermostat 38 on the first inner exhaust exchanger segment 36a connects with a line duct 41. When the temperature of the coolant and exchanger segment 36a are below the correct coolant return temperature, the thermostat 38 is closed. When the temperature of the coolant and exchanger 36b reach the required engine coolant return temperature, the thermostat 38 opens, allowing the hot coolant to enter the line duct 41, and from there to return to the engine.

If the first exchanger segment 36a and coolant are below the needed return temperature, the coolant passes through the open thermostatic valve 37 into the middle exhaust exchanger segment 36b. The coolant entering the middle exchanger segment 36b absorbs additional heat from the middle segment 36b. The middle segment 36b has a first and second thermostat, labeled as items 39 and 40, respectively.

If the coolant in the middle inner exchanger segment 36b has absorbed enough heat energy to reach the needed engine coolant return temperature, the thermostatic valve 40 connecting the inner exchanger segment 36b with the line duct 41 will open, as its other thermostat 39 is closed, diverting the coolant flow C4 to the line duct 41 and from there to the engine 1 through the coolant return hose 42. If the coolant in the middle inner exchanger segment 36b has not absorbed enough heat energy to reach the needed engine coolant return temperature, the thermostat 39 will be open. The other thermostat 40 will be closed, forcing the coolant to flow into the third exchanger segment 36c.

The coolant will absorb additional heat energy from the last inner exchanger 36c, and the heated coolant will circulate from the final exchanger segment 36c through a hose 63 to the line duct 41. From the line duct 41 the coolant C4 returns to the engine 1 through the return line 42.

Referring to FIG. 4, the capabilities of the hybrid system of the present invention can be extended by the addition of an external exchanger such as that depicted as item 55. The example external exchanger 55 is located between the outlet of the primary array exchanger 4 and the line duct 5 leading to the first battery array 8. The external exchanger 55 allows the system to rapidly dissipate excess heat into the atmosphere. To better perform this function, the external exchanger 55 is attached to an outer surface of the vehicle, exposed to outer air flow. During engine operation, hot coolant from the primary array exchanger 4 flows through its outlet hose 64 to the external exchanger assembly, which comprises the items labeled as 55–58. If the coolant is at or below the optimal temperature of the batteries, the inlet thermostat 58 will be closed, and the external exchanger duct thermostat 56 will be open. Coolant then flows through the exchanger bypass duct 57 and into the line duct 5, avoiding the external exchanger. Coolant temperature will be unchanged.

If overheating in the battery arrays develops, coolant flow through the external assembly is redirected through the external exchanger 55—battery array temperature sensors (59–62) signal the external exchanger duct thermostat 56 to close, and open the external exchanger inlet thermostat 58. Passage through the external exchanger 55 allows the coolant to rapidly dump heat from the system and supply cooling at near ambient air temperatures.

Since the optimal temperature of many battery types is near or above 38 degrees C. (100 degrees F.), the external exchanger 55 can provide cooling for batteries, even in warm weather. In cold weather operation, the external exchanger 55 protects the batteries from overheating even more effectively. The external exchanger 55 differs from other exchangers in the system in that not only does it function to rid the system of heat, but is not directly controlled by the temperature of the coolant circulating through it. Instead, the exchanger thermostats 56 and 58 are controlled by the temperature sensors labeled as items 59, 60, 61 and 62 at the outlet of the battery array ducts.

The battery array temperature sensors 59–62 detect the temperature of the coolant exiting the battery arrays. If the coolant is at or below the optimal battery temperature, the signal from the sensors (59–62) closes the external exchanger inlet thermostat 58 and opens the external exchanger duct thermostat 56. Hot coolant bypasses the external exchanger 55, and enters the first battery array 8, its temperature unchanged.

If overheating within the batteries of an array occurs, such as might arise from rapid discharge, the apparatus and method of the described invention carries of the excess heat as follows: First, because of the heat released from the batteries' interior, the battery thermal exchangers 6 absorb some of the excess, with the result that the coolant leaves the battery array raised to a higher temperature. If the increase is above a threshold value designated as excessive, the signal from sensors 59–62 opens the external exchanger inlet thermostat 58, and closes the external exchanger duct thermostat 56. As a result, coolant circulates through the external exchanger 55 before entering the first battery array 8. The external exchanger 55 reduces the coolant nearer to ambient air temperatures. Thus, low-temperature coolant is immediately supplied to the system to assist the absorption of excess heat from the battery arrays.

The particular number of sensors, which are labeled 59–62, being four is for purposes of example only. In a simplified version of the invention, the number of sensors could be limited to as little as a single battery array. Alternatively, similarly controlled thermostats can be added to the secondary heat exchanger assemblies (item numbers 47–50 and 51–54), allowing even more heat to be dumped through the passenger heat ducts, or vented outside through the same duct outlet. The above features permit a wide system temperature control in all climate extremes.

The performance requirements of the external exchanger 55 can be satisfied by a simple design nearly identical to the radiators in conventional automobiles, similarly mounted at the front of the vehicle to take advantage of the air stream when the vehicle is in motion. The external exchanger 55 will typically be cooling a liquid nearer to 38 degrees C. than the 100 degrees C. of conventional car radiators, and originating from a much smaller engine. The size and weight of the exchanger can be correspondingly slight. Since the batteries do not discharge rapidly when the hybrid vehicle is moving slowly or is stationary, overheating is unlikely in these conditions. For this reason, an auxiliary cooling fan to maintain airflow through the external exchanger surfaces at low speeds is not a necessity. Operation of the vehicle on a steep grade with a high load, or excess heat remaining from previous high speed, and other high demand operations are exceptions. Inclusion of a cooling fan would add reliability and performance under these conditions.

The high weight of batteries is a limitation of electric vehicles that markedly distinguishes them from the superior power-to-weight ratio of internal combustion vehicles. This characteristic is a consideration in the proposed hybrid power system. In addition, the high weight penalty incurred with batteries renders the added weight of peripheral equipment a major issue. For example, the added weight resulting from the external exchanger 55 and, if necessary, from a cooling fan (not shown), must be carefully considered and minimized as much as possible. Any draw incurred from peripheral equipment further detracts from vehicle efficiency, since power draw requires more battery storage capacity and, hence, more weight. An example of such power draw is the optional cooling fan. Therefore, the inherent high weight of batteries in electric vehicles creates a need to conserve weight elsewhere in the vehicle, and to minimize the power draw required by peripheral equipment.

The above-described embodiments of the instant invention provide a size/weight/power improvement over the prior art, in part due to providing greater effective storage capacity due to the temperature control. In addition, the system of exchangers allows production of usable heat and temperature control for the batteries, but at the same time, using the batteries as a heat sink for the engine allows the components of the heat exchange system to be much smaller and lighter. The option of using smaller and lighter heat exchanger components, due to the smaller engine size, allows an innovative arrangement for the external heat exchanger of this invention, which will now be described.

More particularly, although a radiator similar to a pure internal combustion vehicle's would function in the hybrid powered vehicle, the external exchanger 55 should be designed in conformance to the requirements of an electric vehicle. Therefore, rather than add the weight of a radiator and cooling fan to the hybrid vehicle, integrating the external exchanger 55 into an already present structure of the vehicle can perform the same function. The integrated exchanger 55 would also eliminate the wasted electric current of a cooling fan, and the weight of the fan cowl.

Referring to FIG. 5, an example structure and arrangement for such an integrated exchanger will be described.

FIG. 5 depicts the underside of the top sheet 100 of an automobile hood according to this embodiment of the invention. As known to those skilled in the art, the hood of automotive vehicles is well-exposed to air flow, and has a considerable surface area. Attached to the depicted undersurface 100*a* of the top sheet is a length of heat-conductive tubing 102, through which coolant will circulate. The tubing 102 is preferably a corrosion resistant and thermally conductive alloy, such as a corrosion resistance aluminum alloy or an appropriate steel alloy. The tubing 102 must be secured in direct contact with the undersurface 100*a* of the hood 100. On example securing structure is shown at FIG. 6, which depicts securing brackets 104 attached to the hood or any equally effective means of bonding or fastening may be used to place the tubing 102 in firm, direct contact with the hood undersurface 100*a*. Intimate metal-to-metal contact of the tubing 102 with the surface 100*a* of the hood is preferred, as this allows heat transfer from the coolant in the tubing into the sheet metal of the hood.

During the operation of the engine, hot coolant from the hybrid power system will be thermostatically controlled to flow through the tubing 102, by the thermostatic control means described above. The heat is conducted into hood 100 by contact of the tubing 102 with the hood underside 100*a*. The heat is conducted to the outer surface 100*b* of the hood 100, which loses this heat to external airflow, making the hood an effective heat sink. Because the hood surface 100*b* is an exposed surface, heat will continuously dissipate through air convection, even when the car is stationary. This eliminates any need for a cooling fan and cowl.

As described above, the sheet metal of the hood 100 secures and supports the tubing 102. In addition to the heat conduction function, the attachment of the tubing 102 forms a three-dimensional hood structure having a considerably stiffer structure than that of a conventional sheet metal hood. The structural rigidity provided by the attached tubing would allow even thinner sheet metal that used for conventional hoods, with an equal or stronger structure resulting. Alternatively, the attached tubing would render unnecessary the box-shaped reinforcements, which present automobile manufacturers weld to the underside of their sheet metal hoods.

The arrangement of FIGS. 5 and 6 therefore eliminates weight the weight of a separate radiator, cooling fan and cowl, thereby reducing net vehicle weight. Manufacture costs may also be reduced, since multiple components are replaced with a single one. Still further, the elimination of a front-mounted radiator removes the usual aerodynamic constraints resulting from the inclusion of a radiator in the frontal area of the vehicle, as well as removing the frequently difficult consideration of providing air flow to the radiator.

Regarding materials for the integrated external heat exchanger of FIGS. 5 and 6, an all-aluminum integrated hood, (aluminum tubing and sheet metal) would be more efficient, due to the superior conductivity of aluminum, relative to steel. In addition many aluminum alloys have a significantly greater strength-to-weight ratio than the typical steel alloys used for mass production automobiles.

The present inventor has identified no actual safety hazard resulting from heating of the outer hood surface due to the integrated radiator. The temperature of the coolant circulating in the tubing, as required by most battery types, will be slightly above 38 degrees C.—which is approximately the body temperature of a person.

Referring to FIG. 8, a preferred embodiment of the integrated external heat exchanger employs a corrugated upper sheet 110 of the hood, the corrugations 110*a* matching the diameter of the tubing. The corrugation increases the area of the tubing-to-sheet metal surface contact from a narrow line of contact to a contact area equal to half the surface area of the tubing. The increased area markedly increases the efficiency of heat transfer from the coolant tubing 102 to the outer surface of the hood 100*b*. The corrugation of the upper sheet also increases its strength. Securing the tubing 102 to the sheet increases its strength still further. If a second, lower sheet is attached, a simple, flat sheet will function.

In the example structure of FIG. 8, a corrugated lower sheet 114 is shown instead of the flat sheet. If the upper and lower corrugated sheets 110 and 114 are joined securely to one another by brackets, spot-welding, or bonding, the resulting sandwiched structure will have a high degree of directional stiffness and strength, parallel to the orientation of the corrugation's axis. Referring to FIG. 9, an example variation on the structure of FIG. 8 forms the outer sheet with smooth, ribbed corrugations rather than sharp edges, produces a functional, rounded appearance.

The same high-strength sandwiched structure for the external exchanger can be incorporated into other exposed areas of the vehicle as a structural element. Integrating the external exchanger structure into front fenders would increase the vehicle's ability to absorb crash energy in a frontal collision. Similar gains can be made in other areas of the vehicle. More particularly, electric vehicles need to meet standards of crash protection, but have a limited margin for additional material and structural material elements that can be dedicated to this purpose. This is due to the weight disadvantage inherent in the mass of the batteries. Use of the integrated structures allows weight to be conserved while strength and rigidity can be increased in problematic areas.

The thermal exchangers 6 use the batteries 66 as a heat sink for engine cooling in temperate conditions, allowing the heat exchange system components to be of minimal size and weight. The thermal exchangers 6, at the same time, allow heat to be added to, or removed from, the batteries in a controlled manner. The rate and quantity of heat than can be transferred by the battery thermal exchangers 6 is limited, however, by their surface area and the thermal conductivity of the battery electrodes extending into the batteries' interior. The efficiency of transfer can be increased by the inclusion of the following two additional design features.

The first addition uses a modification of the line ducts to increase the area of surface contact between the exchanger system and the batteries. As before, this modification avoids any appreciable increase in vehicle weight. The line ducts serve as line splitters for the coolant hoses, enabling the coolant to flow over multiple batteries and reconverge.

In FIG. 10, the basic function of the line ducts is represented. In FIG. 11, a modification of the line duct is represented. As shown in FIG. 11, a heat conductive plate 67*a* joins the two line ducts. The battery bases rest on the plate 67*a*. The plate transfers heat differences between the coolant in the ducts and the interior of the battery through contact with the battery faces, a much larger surface area than the battery thermal exchangers 6.

The addition of the line duct conductive plate 67*a* avoids adding to the total vehicle weight by integrating with the support structure. Using the conductive plates as direct supports for the batteries would require them to be prohibitively thick, and therefore too heavy. To conserve weight, the connecting plates need only be a few thousandths of an inch thick, and can rest on a light-weight support base of polymer, composite or other suitable material. By bonding or otherwise fastening the thin duct to the support base material would produce a stronger, stiffer combined structure. The integrated line duct 67 would improve the transfer of heat energy and still permit a strong, light structure.

Figure 12:
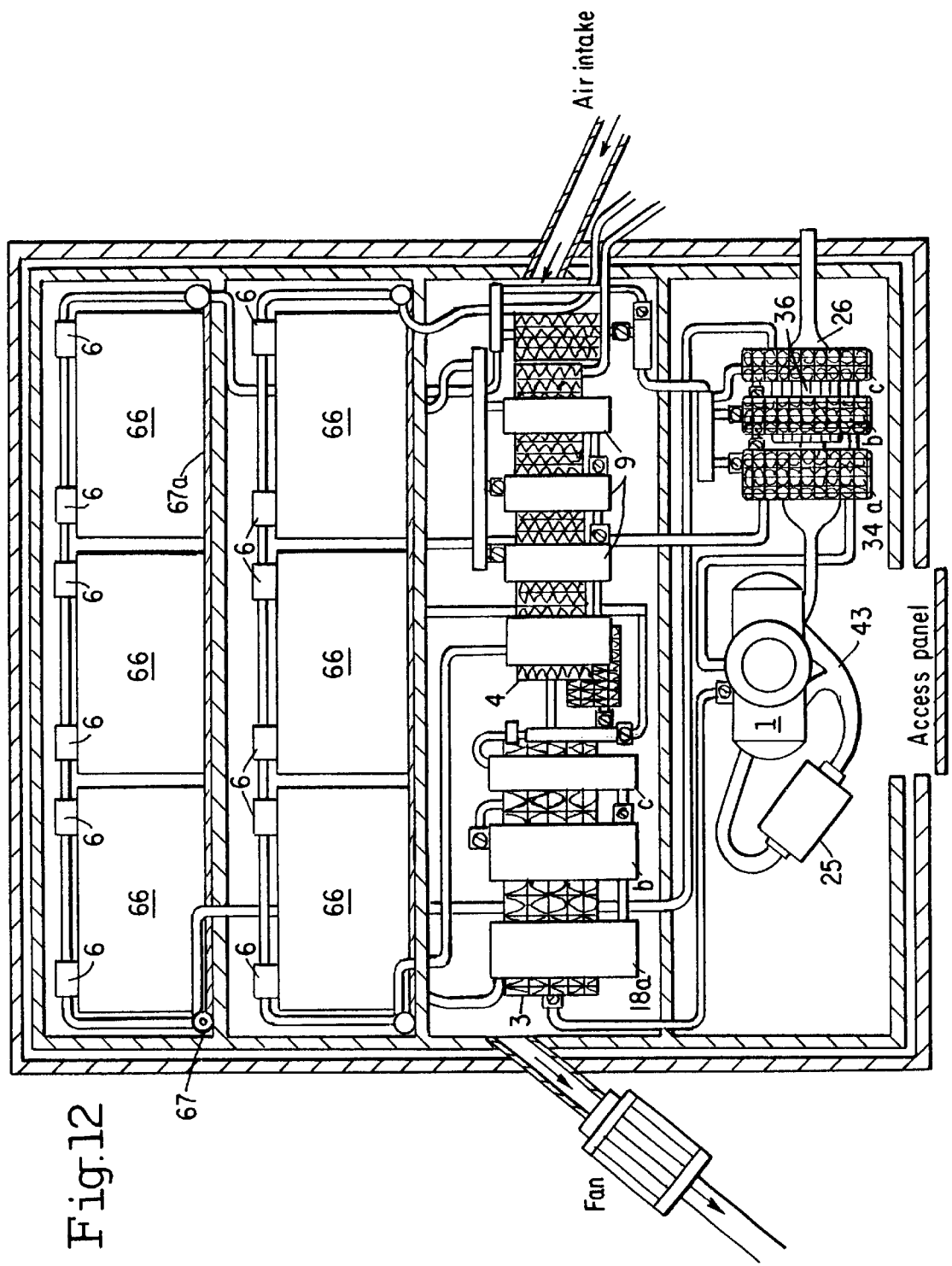
FIG. 12 is a sectional front view of one embodiment of the hybrid system heat storage and regulation enclosures.

Referring to FIG. 12, a further embodiment of the present invention will be described, which may be combined with each of the prior described embodiments, comprising apparatus for retaining heat generated by the vehicle's engine for an extended time after the engine is shut off. This includes the shut off times occurring during the vehicle's operation, as well as the shut off time after the vehicle is stopped and parked. As will be described, the heat retention increases the efficiency of the vehicle in addition to the increase obtained from the earlier described embodiments.

More particularly, as described in its embodiments above, the present invention uses the heat generated by the vehicle's internal combustion engine, heat that is normally dissipated into the atmosphere, to controllably heat the batteries and maintain them within an optimal temperature range. As described, the heating depends on the internal combustion engine's coolant. However, if the vehicle has sat for even two hours, particularly in cold weather, the batteries have cooled to well below that optimal temperature. Therefore, for the first several minutes of operation the vehicle's batteries may have only, for example, ten to forty percent of their nominal amp-hour capacity.

The present embodiment significantly reduces the deleterious effect of the vehicle sitting for extended periods without its internal combustion engine operating. Referring to FIG. 12 this embodiment and its features will be described. As can be seen from FIG. 12, the batteries are enclosed with the line ducts in a separate sub-compartment. This insulates them from cold and isolates them from high temperatures of the engine and exhaust components (not necessary for very high temperature battery types.) The flow of coolant through the battery thermal exchangers and line ducts maintains the temperature equilibrium of the batteries during operation, adding or removing heat as needed.

The remaining thermal exchanger system components—the radiator/heater, primary array exchanger, outer exchangers, and secondary heat exchangers are housed in a compartment exterior to the inner battery compartment.

This compartment is ducted, and the warm air withdrawn from it is circulated through the passenger compartment for heating. When passenger heat is not needed, the warm air is ducted outside the vehicle. When the system is not in operation, the compartment retains the heat energy. An air space between this compartment and the battery compartment further insulates the batteries, and allows warm air from the exchanger components to fill the space and slowly release heat into the inner compartment, maintaining the batteries' temperature for more extended periods of time.

The hottest parts of the system—the engine and exhaust components are housed in another sub-compartment, exterior adjacent to the exchanger compartment, optimally beneath it for cold weather conditions (the sequence of compartments can be varied in the vehicle design to better suit specific climates—for extreme heat areas, it could be advantageous to locate the highest-temperature compartment in the top level).

During periods between operation, heat from the engine and exhaust transfers into the exchanger compartment, maintaining the temperature of the exchanger system. An additional outer air space would facilitate the transfer, and provide another layer of insulation. Placing the engine compartment at the base of the structure would leave the engine more readily accessible for service from beneath the vehicle, via a removable, insulated access panel, as shown in FIG. 12. The engine may be directly attached to the frame or body of the vehicle, allowing it to serve as a stiffening structural member, and conserving weight. The above arrangement of compartmentalization and insulation organizes the hybrid system into an orderly thermal mass.

This stored heat energy can be retained for long periods of time. In a vehicle used for daily commuting to work or school, this ability to retain a significant percentage of heat energy from the previous day results in multiple, reinforcing efficiencies. First, the batteries remain protected in cold weather, thereby increasing their electrical output and storage capacity. The rate and range of their temperature cycling is reduced, which increases battery life. The stored heat allows the passenger heating system to supply warmth at start-up almost immediately. Further, because the batteries remain warm, less fuel is consumed to bring them to optimal temperature. Still further the thermal mass will slow engine cooling between uses. A constantly warm engine would eliminate the inefficiency of cold starting, again reducing fuel consumption.

Because catalytic converters do not begin functioning until reaching operating temperature (about 500 F.), keeping the converter warm for longer periods of time reduces pollutant emissions. Similarly, because the catalytic converter is a source of heat energy in the hybrid system, its shortened warm-up also allows the rest of the system to reach optimal temperature more rapidly. The prolonged heat storage would allow commuters to return to the vehicle, stored outside during the day, and still return home with the batteries unimpaired by cold, which is a problem with conventional electric vehicles.

The battery thermal exchangers 6 and integrated line ducts 67 transfer heat through contact with outer battery surfaces. They are effective for warming the batteries, creating an engine heat sink, and can also aid in cooling overheated batteries. They are particularly convenient in that they can be used on existing batteries, without modifying the battery itself.

Because these heat transfer devices move energy through the outer surfaces of the battery, the rate at which the temperature of the battery core can be changed lags behind. Typical battery casings are made of materials having poor thermal conductivity. If the operating environment is cold, the insulative casing improves the storage of introduced heat for longer periods of time. However, if the interior of the battery has become extremely cold, the time required to effect a large temperature change from the exterior of the battery to the core will result in a slow initial warm up.

If the battery core overheats, as from rapid discharge, the battery thermal exchangers 6 and integrated line ducts 67 remove heat at a limited rate; if the battery core suddenly overheats, the insulative battery casing traps the excess heat, damaging the battery.

Temperature regulation can be more rapidly controlled by placing a thermal transfer device, or battery exchange channel 68, within the interior of the battery, as shown at FIG. 13. The battery exchange channel 68 is a heat-conductive tube, such as glass, or any conduit through the interior of the battery, with a channel allowing the circulation of a coolant fluid to remove or introduce heat as needed. Highly pressurized and superheated fluids can be employed in applications where the introduction of more intense heat is useful.

Referring to FIG. 14, the battery exchange channel 68 may pass through the base of the battery or any other internal position. Multiple channels may be included within a single battery to further increase the rate of heat transfer. Apertures made within the battery plates and interior structure can accommodate passage of the conduit and channel.

While the foregoing invention has been described with specific references to examples of its preferred embodiments, it should be understood that various substitutions, variations, and modifications may be made thereto without departing from the scope of the invention

Having thus described my invention, what I claim as new and desire to secure by Letters Patent is as follows:

1. An apparatus for controlling the temperature of a battery in a vehicle having a liquid-cooled internal combustion engine, comprising:

a liquid-cooled internal combustion engine having a coolant fluid jacket, said coolant fluid jacket having a jacket output port and a jacket input port;

a first fluid path having an input connected to said jacket output port, an output, a first pipe section and a second pipe section between said input and said output;

a first heat exchanger conductor thermally connected to said first pipe section;

a first battery heat conductor thermally connected to said second pipe section;

a first battery thermally connected to said first battery heat conductor;

a first jacket structure thermally connected to said first heat exchanger conductor, having an input port connected to said output of said first fluid path, and an output port;

a second jacket structure thermally connected to said first heat exchanger conductor, having an input port connected to said output port of said first jacket structure, a main output port, a bypass output, and a thermostatically controlled valve means for blocking fluid flow through said bypass port in response to a fluid temperature below a battery control temperature and for blocking fluid flow through said main output in response to a fluid temperature above said battery control temperature, said battery control temperature based on a battery target operating temperature;

a third jacket structure thermally connected to said first heat exchanger conductor, having an input port connected to said main output port of said second jacket structure, and a main output port;

a first bypass fluid path, having a first input port connected to said bypass output of said second jacket structure, a second input port connected to said main output port of said third jacket structure, and an output port; and a second fluid path, having an input connected to said output port of said first bypass fluid path, and an output connected to said input port of said fluid jacket.

2. An apparatus according to claim 1, wherein said internal combustion engine has an exhaust apparatus including a catalytic converter, wherein said second fluid path includes a re-heater jacket having a structure thermally connected to said catalytic converter for re-heating a fluid within the re-heater jacket to a predetermined engine coolant temperature range prior to entering the input port of the coolant fluid jacket of the internal combustion engine.

3. An apparatus according to claim 2, wherein said second fluid path further comprises a third pipe section and said first fluid path further-comprises a fourth pipe section, said third pipe section being between said input of said second fluid path and said re-heater jacket, and said fourth pipe section having an input end and an output end; and further comprising:

a second battery heat conductor thermally connected to said third pipe section;

a second heat exchanger conductor thermally connected to said fourth pipe section; and a second battery thermally connected to said second battery heat conductor; and wherein said second fluid path further comprises a fourth jacket structure thermally connected to said second heat exchanger conductor, having an input port connected to said output end of said fourth pipe section, and an output port;

a fifth jacket structure thermally connected to said second heat exchanger conductor, having an input port connected to said output of said fourth jacket structure, a main output port, and a bypass port;

a second bypass fluid path, having a first input port connected to said bypass port of said fifth jacket structure, a second input port connected to said main output port of said fifth jacket structure, and an output port; and a fluid path connecting said output port of said second bypass fluid path into said re-heater jacket.

4. An apparatus according to claim 1 further comprising a thermostat valve for stopping flow of fluid below said battery control temperature through said jacket output port of said coolant fluid jacket, and for providing fluid flow through said jacket output port of said coolant fluid jacket, above said battery control temperature.

5. An apparatus according to claim 2 further comprising a thermostat valve for stopping flow of fluid below said battery control temperature through said jacket output port of said coolant fluid jacket, and for providing fluid flow through said jacket output port of said coolant fluid jacket above said battery control temperature.

6. An apparatus according to claim 3 further comprising a thermostat valve for stopping flow of fluid below said battery control temperature through said jacket output port of said coolant fluid jacket, and for providing fluid flow through said jacket output port of said coolant fluid jacket above said battery control temperature.

7. An apparatus according to claim 3, wherein said second fluid path further comprises:

an outer jacket structure surrounding said re-heater and thermally connected to said catalytic converter;

a fifth pipe section having output end;

a fluid path from said output end of said fifth pipe section into said outer jacket structure; and further comprising a third battery heat conductor thermally connected to said fifth pipe section;

a second heat exchanger conductor thermally connected to said fourth pipe section; and a third battery thermally connected to said third battery heat conductor.

8. An apparatus according to claim 3, wherein said fourth pipe section is more proximal to said output port of the fluid jacket of the internal combustion engine than the first pipe section.

* * * * *